United States Patent [19]

von Buren et al.

[11] Patent Number: 5,040,969
[45] Date of Patent: Aug. 20, 1991

[54] TANDEM INJECTION MOLDING MACHINE WITH DIRECT FEED TO MOLDS

[75] Inventors: Stefan von Buren, Toronto; Anthony S. Paulovic, Bolton, both of Canada

[73] Assignee: Husky Injection Molding Systems Ltd., Bolton, Canada

[21] Appl. No.: 470,693

[22] Filed: Jan. 26, 1990

[51] Int. Cl.$^5$ .............................................. B29C 45/07
[52] U.S. Cl. ................................ 425/572; 264/328.8; 264/328.11; 425/574; 425/581; 425/589
[58] Field of Search ......................... 264/328.8, 328.11; 425/572, 574, 588, 595, 581, 589

[56] References Cited

U.S. PATENT DOCUMENTS

| 4,090,836 | 5/1978 | von der Ohe et al. | 425/574 |
| 4,242,073 | 12/1980 | Tsuchiya et al. | 425/572 |
| 4,307,057 | 12/1981 | Hettinga | 425/576 |
| 4,734,243 | 3/1988 | Kohama et al. | 264/328.8 |
| 4,867,938 | 9/1989 | Schad et al. | 264/334 |

FOREIGN PATENT DOCUMENTS

| 1325875 | 3/1963 | France | 425/574 |
| 15144 | 5/1970 | Japan | 425/574 |

*Primary Examiner*—Timothy Heitbrink
*Attorney, Agent, or Firm*—Bachman & LaPointe

[57] ABSTRACT

An injection molding machine wherein a molding compound supply unit having a nozzle is moveable relative to a plurality of mold stations. Clamps are provided as an adjunct to the supply unit or as an adjunct to the mold stations for effecting a compound seal at each mold station. Appropriate power sources are provided for accomplishing the seal.

15 Claims, 4 Drawing Sheets

TANDEM INJECTION MOLDING MACHINE WITH DIRECT FEED TO MOLDS

BACKGROUND OF THE INVENTION

The present invention relates to injection molding machines having at least two molding stations arranged in tandem wherein a single moveable nozzle is employed to service each molding station in sequence.

SUMMARY OF THE INVENTION

It is a feature of the present invention to provide a source of moldable compound including a nozzle means where the nozzle is moveable, while in communication with the compound source, from station to station to introduce moldable compound into a mold located at the respective stations A further feature of the invention is the provision of mold means having a parting line wherein the mold means includes a mold inlet means which is arranged coaxially with at least a portion of the mold parting line.

A further feature of the invention is the provision of a mold inlet means which is a seamless extension of the mold means.

A still further feature of the invention is the provision of means such as an extruder or like apparatus for advancing moldable material toward a molding station wherein a nozzle means is carried by supply means and the supply means and the nozzle means are moveable as a unitary assembly from station to station.

A further feature of the invention is the provision of primary clamping means for clamping molds along a longitudinal axis of the molding machine and a secondary clamping means for clamping the nozzle means directly to a mold (or to a hot runner manifold servicing a mold) along an axis that is generally perpendicular to the longitudinal axis.

It is a further feature of the invention wherein the secondary clamping means and the nozzle means are both carried by the supply means.

It is a further feature of the invention wherein a secondary clamping means is provided at each molding station.

A further feature of the invention is the provision of moveable platen disposed between two mold stations where the platen supports hot runner manifolds servicing molds at each station, and the platen includes secondary clamping means individual to each manifold for clamping a moveable nozzle to a manifold inlet.

An injection molding machine embracing certain principles of the present invention may comprise moveable supply means for introducing moldable material into said mold means, nozzle means carried by said supply means, power means for moving said supply means operable to register said nozzle means with each said mold inlet means, and nozzle clamp means (secondary clamp means) for sealing the nozzle means to mating mold inlet means.

A process embracing certain other principles of the invention and practiced by the operation of apparatus of the present invention may comprise the steps of combining a moldable material supply means, a single nozzle means and a clamp means into a unitary assembly and moving the assembly from station to station to seal the nozzle and to supply compound via said nozzle at each station in sequence.

The language "mold inlet means" includes a seamless extension of a mold or a hot runner manifold servicing a mold.

Other features and advantages of the present invention will become more apparent from an examination of the succeeding specification when read in connection with the appended drawings, in which;

DETAILED DESCRIPTION OF THE INVENTION

Figure 1:
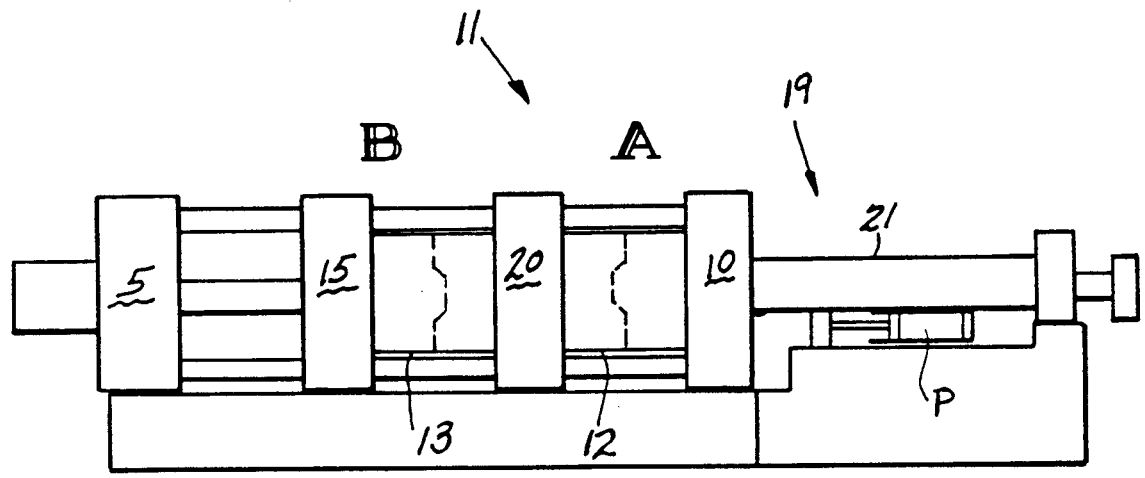
FIG. 1 is a side elevational view of a typical tandem arrangement of mold stations A and B.
Figure 2:
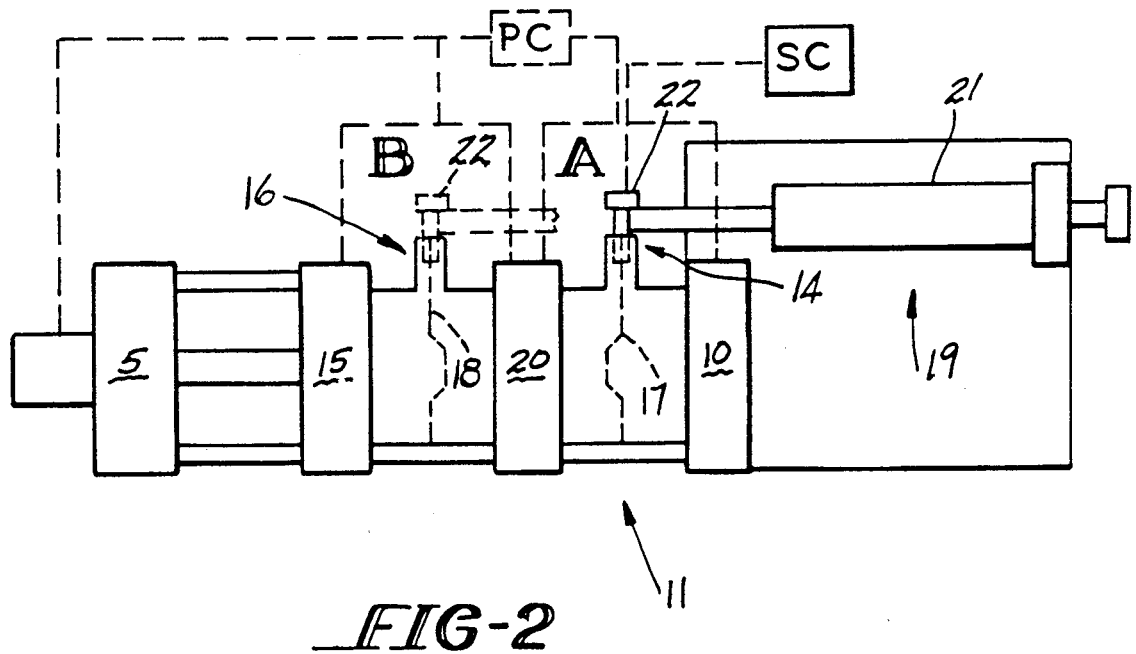
FIG. 2 is a top plan view of the illustration of FIG. 1.

Referring in detail to FIGS. 1, 2, 3 and 4, a typical tandemly arranged injection molding machine 11 includes fixed platens 5 and 10, moveable platens 15 and 20 and two molding stations A and B, each having molds 12 and 13 opened, closed and clamped under control of primary clamping means (PC) in well known fashion. That is, both molds can be opened separately or individually and can be clamped separately or in unison depending upon the manner in which the primary clamping means is programmed.

Each mold means has an inlet means 14 and 16 which is an extension of the mold body and the inlet means is generally coaxial with the mold parting lines 17 and 18.

The inlet means disclosed is a seamless adjunct to the mold body; obviously the inlet means could be designed as a separate piece part fastened by appropriate means to the mold body.

Molding material is supplied to the mold stations A and B by a moveable molding material supply means 19, which in the present disclosure, is an extruder 21 having an attached nozzle means 22 and a nozzle valve 23.

The extruder, nozzle means and valves are moveable as an assembly, to and from mold station to mold station under control of a first power means P.

Figure 3:
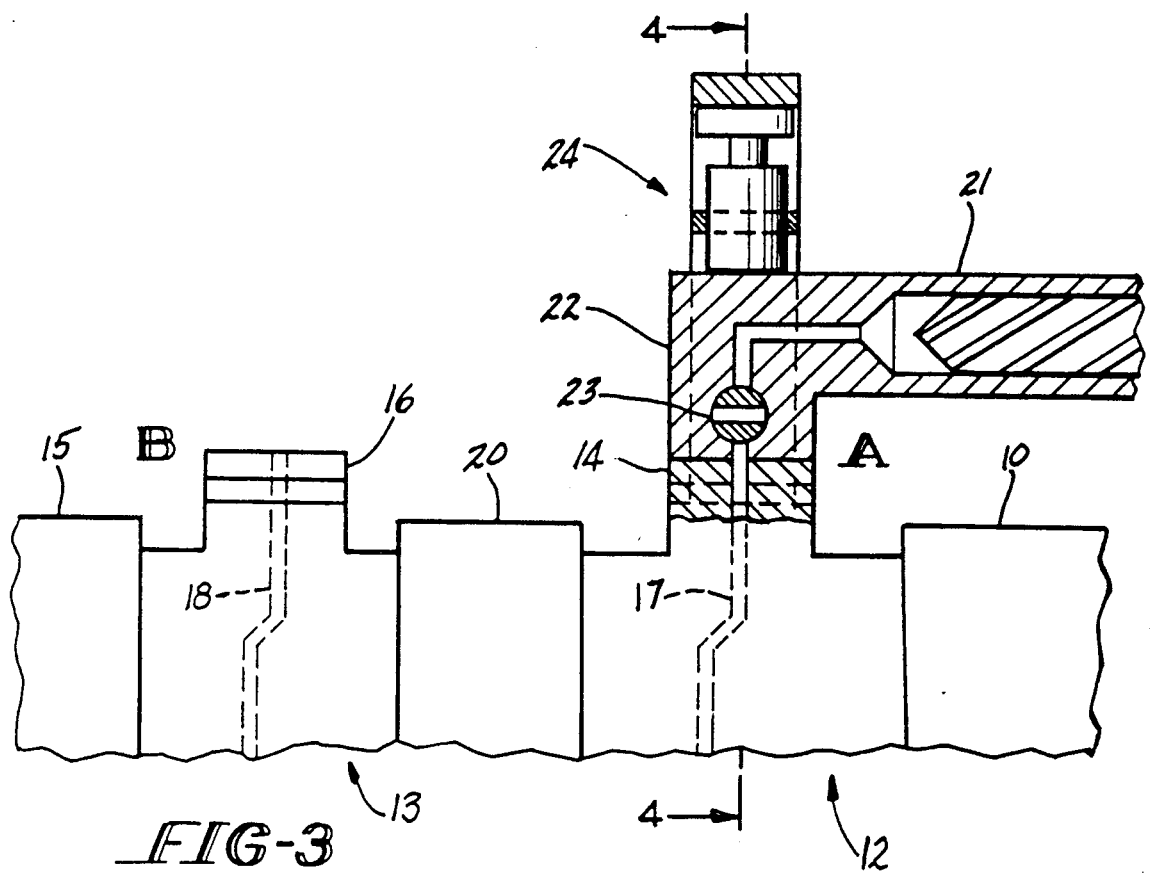
FIG. 3 is a fragmentary view of a portion of FIG. 2, enlarged for clarity.
Figure 4:
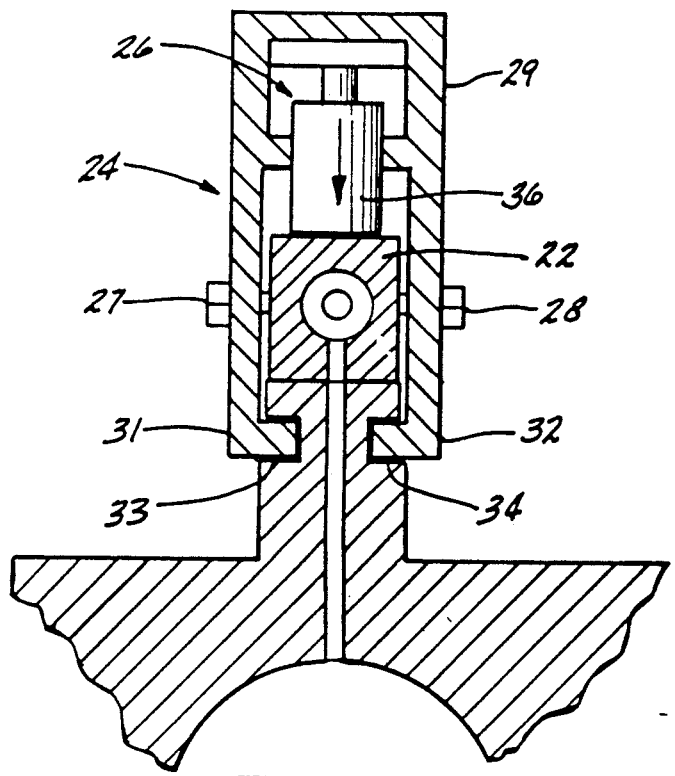
FIG. 4 is a vertical section of FIG. 3 in the plane of line 4—4 as viewed in the direction of the arrows.

As indicated in greater detail in FIGS. 3 and 4, the extruder 21, its nozzle 22 and valve 23 are moveable into registration with a mold inlet means such as is illustrated in FIG. 3.

In the arrangement of FIGS. 3 and 4, the moveable assembly includes a nozzle clamp means 24 and nozzle clamp power means 26.

The nozzle clamp power means 26, secured to the nozzle means by a suitable fastener such as by bolts 27 and 28, comprises a piston-cylinder assembly supported in a body member terminating in a pair of dogs or claws 31 and 32, operable to slide into and make an interlocking connection with mating slots 33 and 34 formed in the mold inlet means as is most apparent in FIG. 4.

When the extruder, nozzle, nozzle valve, nozzle clamp and nozzle clamp power means are moved as an assembly and are positioned in register with the nozzle inlet means as shown in FIG. 3 at Station A, the nozzle clamp power means 26 is energized to place the dogs 31 and 32 under a tensile stress as piston 36 bears down upon the nozzle 22 t ⓒseal the nozzle to the inlet means. Upon opening nozzle valve 23, moldable material is injected into the mold.

Figure 5:
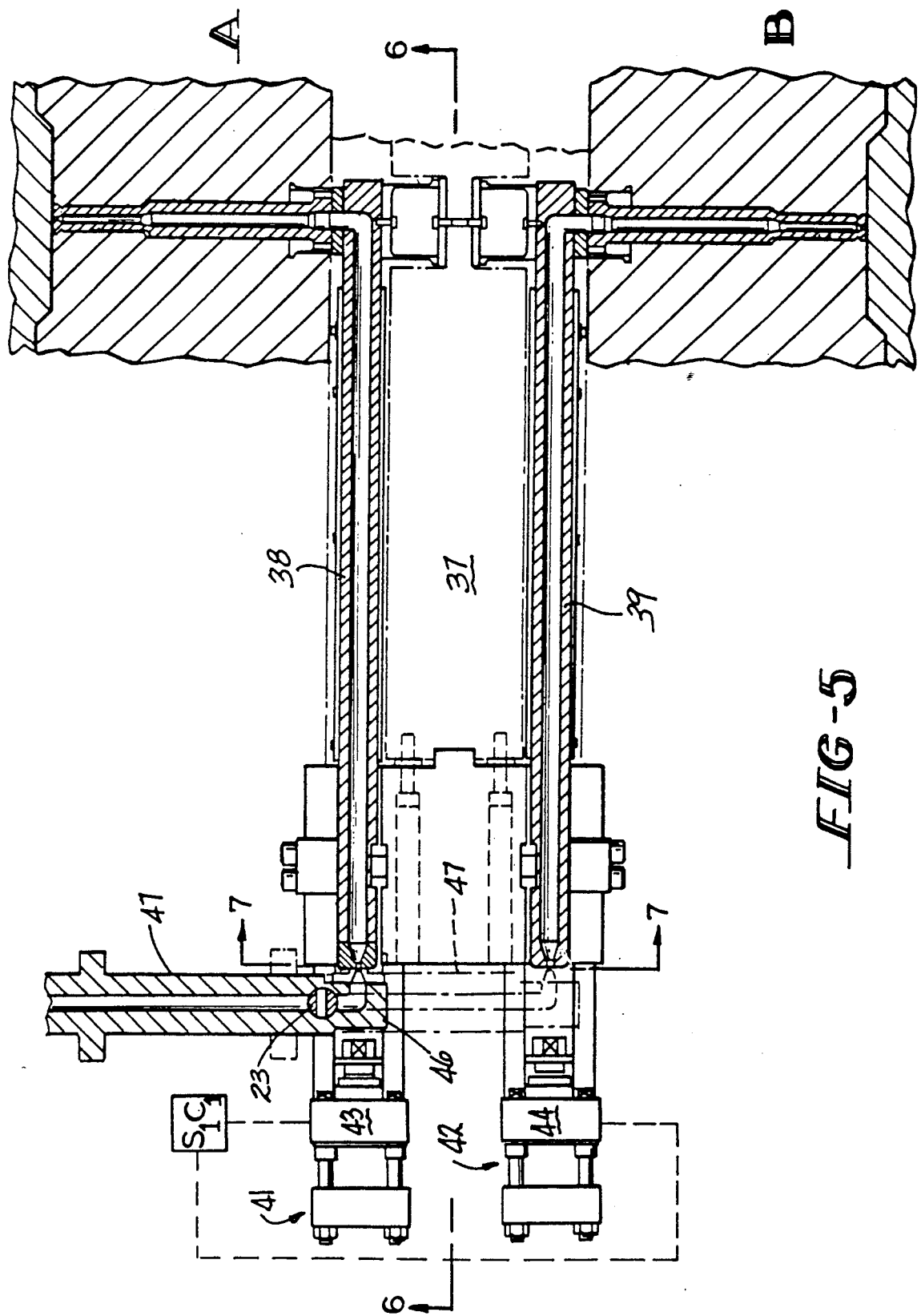
FIG. 5 is a top plane view, partially in section, showing an alternative embodiment of the present invention.
Figure 6:
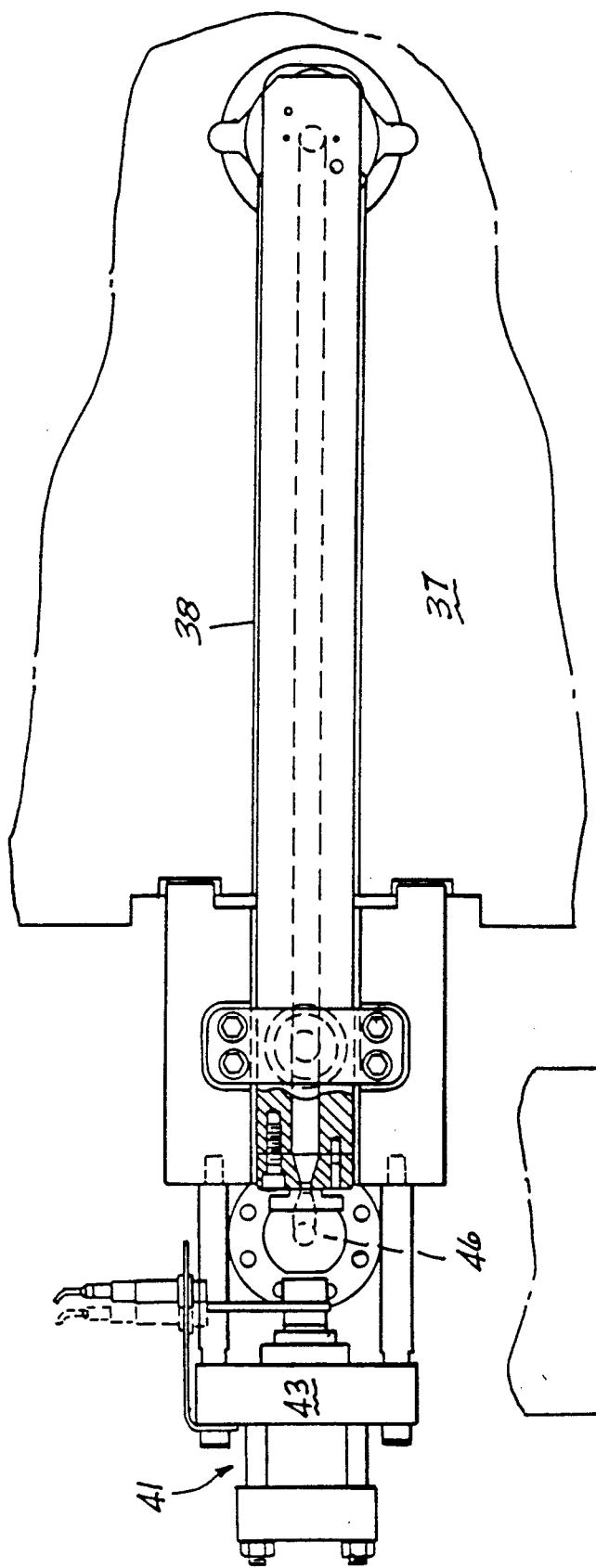
FIG. 6 is a sectional view of the showing of FIG. 5 as viewed in the plane of the line 6—6 and in the direction of the arrows.
Figure 7:
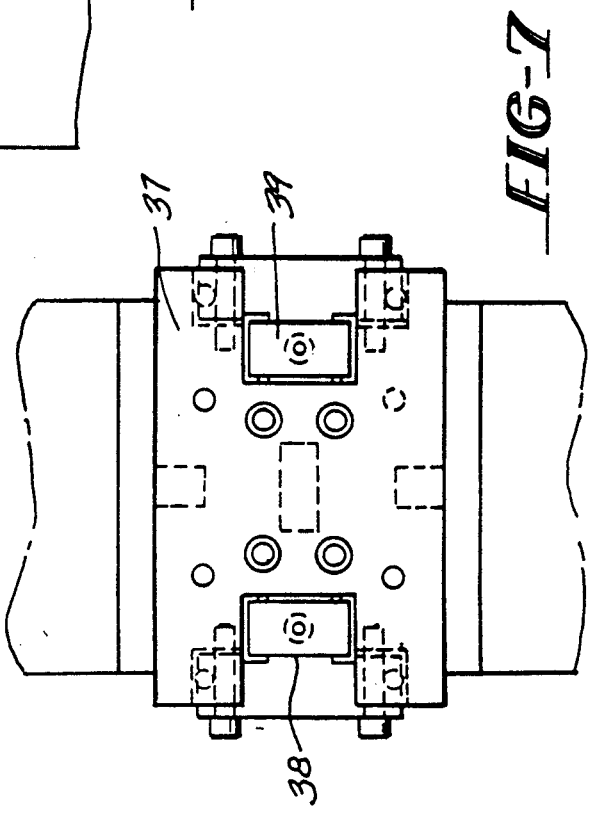
FIG. 7 is a sectional view of FIG. 6 as viewed on the plane of line 7—7 and in the direction of the arrows.

FIGS. 5, 6 and 7 show an alternative arrangement wherein a moveable platen 37, having opposed hot runner manifolds 38 and 39 supplying moldable material to molds at stations A and B, supports nozzle clamp means 41 and 42 individual to each mold station.

That is, in this arrangement the nozzle clamp means is separate from the molding material supply means and is fixed at each mold station.

Suitable power means such as piston-cylinder assemblies 43 and 44, under control of nozzle clamp control means $S_1C_1$ are operable to seal nozzle means to respective hot runner manifolds (mold inlet means) when the extruder 47 is moved into registry with each manifold inlet.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In an injection molding machine having a series of tandemly arranged molding stations wherein each molding station includes a mold having a parting line and a mold inlet, said mold inlet defining a lateral extension of said mold, said parting line extending into said mold inlet, the improvement comprising:

moveable supply means for introducing moldable material into each said mold, nozzle means carried by said supply means said nozzle means cooperating with each said mold inlet, power means for moving said supply means operable to register said nozzle means with each said mold inlet, nozzle clamp means moveable along each said parting line for sealing the nozzle means to a mating mold inlet, and primary clamp means for sealing said parting line and said parting line extension along a first axis.

2. The machine of claim 1 wherein the nozzle means defines one nozzle operable to register with each mold inlet selectively and individually.

3. The machine of claim 1 wherein the nozzle clamp means is a fixture at each molding station.

4. The machine of claim 1 wherein the nozzle clamp means is carried by said supply means.

5. The machine of claim 1 wherein each mold inlet is disposed generally coaxially with and bisected by said parting line.

6. The machine of claim 5 wherein each mold inlet is a seamless extension of the mold.

7. The machine of claim 4 wherein the nozzle clamp means and an associated mold inlet make an interlocking connection.

8. The machine of claim 7 wherein the interlocking connection defines at least one claw and a cooperating slot.

9. The machine of claim 8 wherein the at least one claw is carried by said nozzle clamp means, and the slot is formed on each said mold inlet.

10. The machine of claim 9 wherein the at least one claw is fixed to said supply means and the slot is formed in said mold inlet.

11. The machine of claim 10 wherein the supply means includes nozzle clamp power means for placing the at least one claw and cooperating slot under tensile stress while pressing the nozzle means to a mating mold inlet to create a seal.

12. The machine of claim 11 wherein the nozzle means includes a valve means operable to seal the nozzle means when the nozzle means is in transit from one molding station to another molding station.

13. The molding machine of claim 1 including a secondary clamp means for clamping said nozzle means to a mold inlet wherein the secondary clamp means clamps along a second axis which is generally perpendicular to said first axis.

14. The machine of claim 2 wherein said nozzle clamp means includes power means individual to each mold station for pressing the nozzle means into sealing contact with a corresponding mold inlet.

15. In an injection molding machine having a series of tandemly arranged molding stations wherein each molding station includes a mold, a mold inlet and a hot runner, the improvement comprising:

a single platen common to a pair of adjacent mold stations, a first hot runner communicating with a first mold inlet said first mold inlet disposed on one side of said platen, a second hot runner communicating with a second mold inlet said second mold inlet disposed on an opposite side of said platen, moveable supply means for introducing moldable material into each hot runner, a nozzle carried by said supply means said nozzle being operable to connect with each hot runner, and first and second nozzle clamps supported by said single platen, said first and second clamps being associated with a corresponding molding station for sealing said nozzle to said first and second hot runners selectively whereby moldable material is supplied to each mold inlet individually via respective hot runners.

* * * * *